Figure 4:
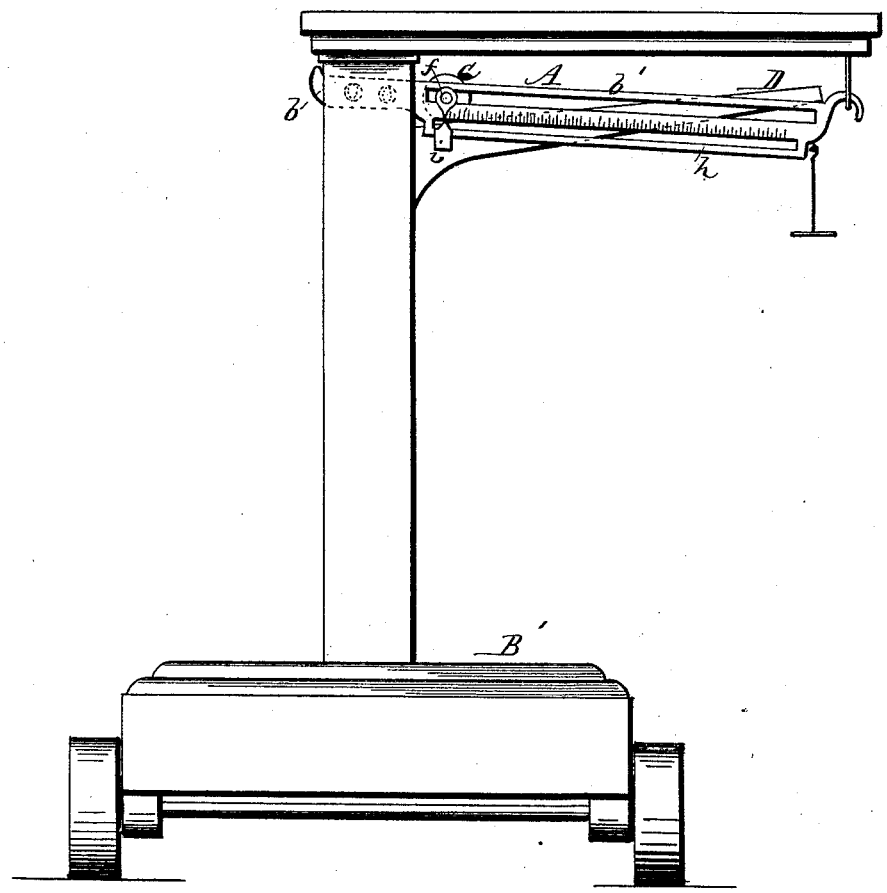

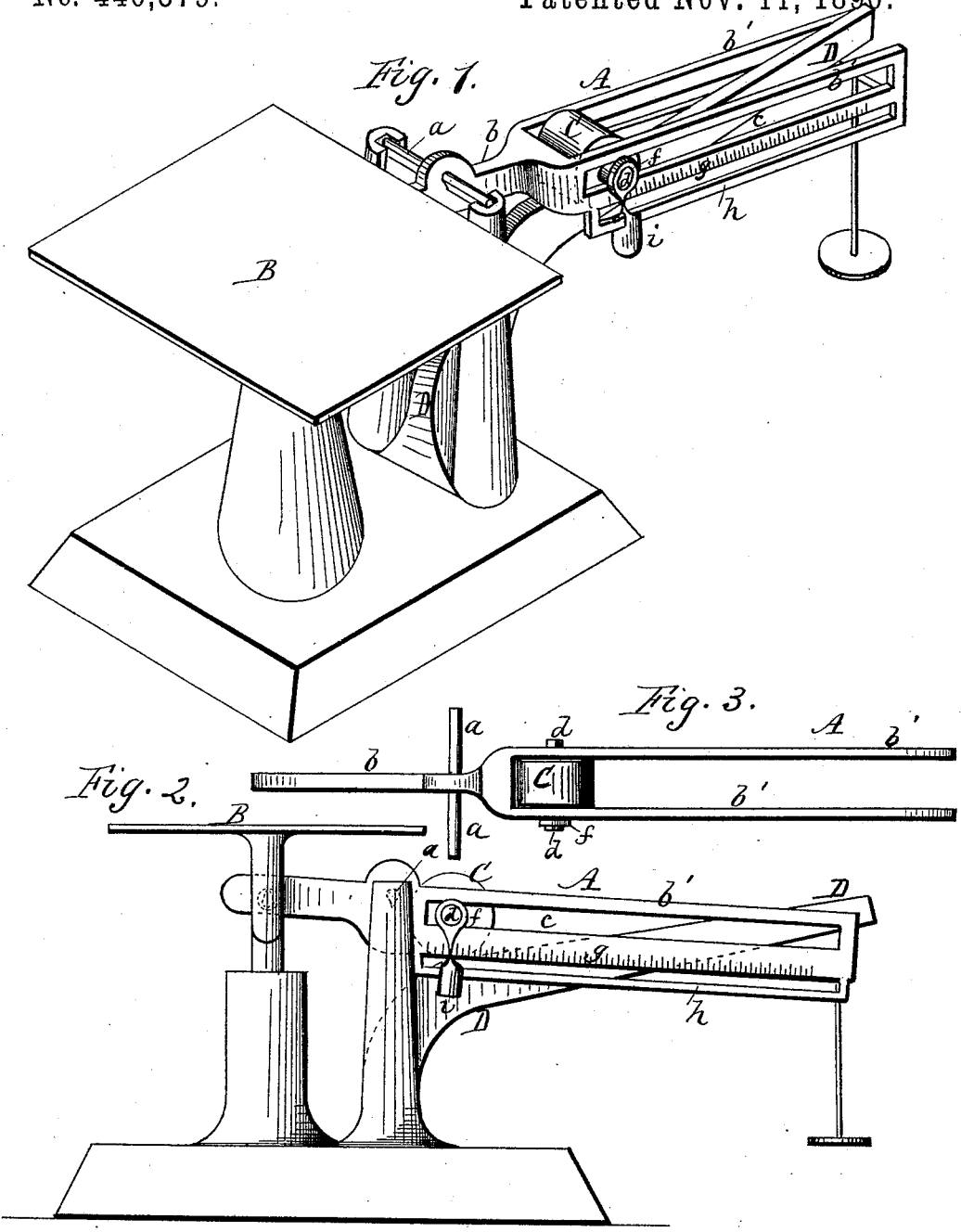

(No Model.)
2 Sheets—Sheet 2.

G. A. SKINNER.
WEIGHING SCALES.

No. 440,579.  Patented Nov. 11, 1890.

Witnesses.  Inventor.

UNITED STATES PATENT OFFICE.

GEORGE A. SKINNER, OF ROCHESTER, NEW YORK.

WEIGHING-SCALES.

SPECIFICATION forming part of Letters Patent No. 440,579, dated November 11, 1890.

Application filed September 24, 1889. Serial No. 324,968. (No model.)

*To all whom it may concern:*

Be it known that I, GEORGE A. SKINNER, a citizen of Great Britain, residing at Rochester, in the county of Monroe and State of New York, have invented certain new and useful Improvements in Weighing-Scales, of which the following is a description.

My improvement relates to that class of self-weighing scales in which a weighted roller is connected with the beam and rolls out by the rising of the beam and up on a reversely-inclined bar, and registers the weight by stopping at a certain point on a registered scale. Devices of this kind are already known and I do not claim the same, broadly.

My invention consists in the construction and arrangement of parts hereinafter described and claimed.

In the drawings, Figure 1 is a perspective view of a balance-scale, showing my invention. Fig. 2 is a side elevation of the same. Fig. 3 is a plan view of the beam removed from place. Fig. 4 is a rear elevation of a platform-scale, showing my invention.

This invention is applicable to all kinds of weighing-scales where a tilting beam is used. Figs. 1 and 2 show a balance-scale, and Fig. 4 a platform-scale.

A is the tilting beam, which is hung on a knife-edged pivot $a$, as usual, and is tilted or thrown up by placing the material to be weighed on the scale-plate B or platform B'. The beam is constructed with the single fulcrum-bar $b$ at one end, and two separated parallel side bars $b'$ $b'$ at the other end, between which rests and rolls the weight C. The side bars $b'$ $b'$ have longitudinal slots $c$ $c$, in which rest the journals $d$ $d$ of the weight, said journals projecting through the sides of the beam and one or both of them being provided with a freely-hanging pointer $f$, that turns loosely on the journal and serves to indicate the weight of the material by resting over an index-scale $g$ on one or both sides of the beam. This scale is marked in pounds and sub-divisions. In its normal position the beam is slightly inclined downward, and the tendency of the roller-weight C is to roll outward toward the outer end; but this tendency is restrained by a reversely-inclined arm D, attached to the frame of the scales and extending outward and upward between the sides of the beam.

The relative inclinations of the beam A and arm D are such that as the beam rises under the impulse of the weight on the scale-pan the roller-weight C rolls out on the incline of the beam but is restrained by the opposite incline of the arm, and the greater the weight on the scale-pan the greater will be the rise of the beam, and the greater the outward movement of the roller. In their normal position the outer end of the arm and the inner end of the beam stand about on a level, but this is not absolutely essential.

$h$ is a supplementary bar on the under side of the beam, extending the whole length and provided with a sliding counter-weight $i$, having a pointed upper end, which registers with the same scale $g$ that the pointer $f$ registers with. This sliding weight is operated by hand. It has special advantages in connection with the roller-weight. By its use the capacity of the scale can be increased. For instance, if it is desired to weigh forty pounds, and the capacity of the beam with the single roller-weight is only thirty pounds, the sliding weight $i$ can be moved out to 20, which increases the resistance of the beam to rise, and the roller-weight will then roll out to 20 to balance the remaining twenty pounds. The sliding weight can also be used to indicate tare weight. For instance, the vessel or package in which the material is to be placed will be first weighed by the roller-weight C, and the sliding weight $i$ is then moved out to the same point to register the weight. This depresses the beam and causes the roller-weight to run back to its normal position. The material placed in the package will then be weighed by the roller-weight running out on the beam, as before. The sliding weight is also of advantage as a register or indicator to show the weight of articles after they have been weighed and removed from the scales. In such case after the material has been weighed by the roller-weight and before the material is removed from the scales the sliding weight is moved out and remains stationary after the material has been removed.

In ordinary self-acting scales of the kind the roller is usually mounted on top of the beam, and is held by a groove or other device, and in case of any accidental blow or the overturning of the scales the roller is liable to be knocked off or displaced. Such roller-weights are usually placed on curved beams, which increases the oscillations and requires pendulums or other devices to steady them, which renders them cumbersome and difficult to handle. It is my object to so construct the beam that the roller-weight is a fixture with it and cannot get displaced. To this end the beam is straight and has double sides between which the weight rests, and it is held by the journals that pass through the slots. At the same time the connection is so loose that the weight can readily roll.

Having described my invention I do not claim simply and broadly a tilting beam, a reversely-inclined arm, and a rolling weight.

What I claim as new, and desire to secure by Letters Patent, is—

1. The combination of the scale-beam A, constructed with double sides $bb$, slots $cc$, and supplementary bar $h$, the roller-weight C, resting between the sides and provided with journals that enter the slots, and the sliding weight $i$, resting on the supplementary bar, as and for the purpose specified.

2. The combination of the scale-beam A, constructed with double sides $bb$, slots $cc$, and supplementary bar $h$, the roller-weight C, resting between the sides and provided with journals that enter the slots, the sliding weight $i$, resting on the supplementary bar, and the fixed arm D, standing reversely to the scale-beam, as shown and described, and for the purpose specified.

3. The combination of the scale-beam A, constructed with double sides $bb$ and slots $cc$, the roller-weight C, resting between the sides and provided with journals that enter the slots, a pointer attached to one of the journals that registers with a scale on the beam, and a fixed arm D, that inclines reversely to the beam, as shown and described, and for the purpose specified.

In witness whereof I have hereunto signed my name in the presence of two subscribing witnesses.

GEO. A. SKINNER.

Witnesses:
CHARLES E. FOXWELL,
R. F. OSGOOD.